(12) United States Patent
Barrio López-Cortijo et al.

(10) Patent No.: US 9,311,433 B2
(45) Date of Patent: Apr. 12, 2016

(54) SYSTEMS AND METHODS FOR IMPROVING THE EXECUTION OF COMPUTATIONAL ALGORITHMS

(75) Inventors: Pablo Barrio López-Cortijo, Madrid (ES); Carlos Carreras Vaquer, Torrejon de la Calzada (ES); Roberto Sierra Cabrera, Pozuelo de Alarcon (ES); Juan Antonio López Martín, Madrid (ES); Gabriel Caffarena Fernández, Madrid (ES); Enrique Sedano Algarabel, Madrid (ES); José Antonio Fernández De Blas, Madrid (ES); Ruzica Jevtic, Villaviciosa de Odon (ES)

(73) Assignees: AIRBUS OPERATIONS S.L., Getafe (ES); UNIVERSIDAD POLITECNICA DE MADRID, Madrid (ES)

( * ) Notice: Subject to any disclaimer, the term of this patent is extended or adjusted under 35 U.S.C. 154(b) by 742 days.

(21) Appl. No.: 13/229,946

(22) Filed: Sep. 12, 2011

(65) Prior Publication Data

US 2012/0303337 A1    Nov. 29, 2012

(30) Foreign Application Priority Data

May 27, 2011    (ES) .................................. 201130884

(51) Int. Cl.
| *G06F 7/00* | (2006.01) |
| *G06F 17/10* | (2006.01) |
| *G06F 17/13* | (2006.01) |
| *G06F 17/16* | (2006.01) |
| *G06F 17/50* | (2006.01) |

(52) U.S. Cl.
CPC ........ *G06F 17/5009* (2013.01); *G06F 17/5018* (2013.01); *G06F 2217/16* (2013.01)

(58) Field of Classification Search
CPC .................................................... G06F 17/5018
USPC ....................................... 703/2; 708/207, 520
See application file for complete search history.

(56) References Cited

U.S. PATENT DOCUMENTS

| 6,426,747 B1 * | 7/2002 | Hoppe et al. .................. 345/419 |
| 6,717,576 B1 * | 4/2004 | Duluk et al. .................. 345/419 |
| 7,716,100 B2 * | 5/2010 | Metlapalli ....................... 705/35 |
| 2005/0288800 A1 * | 12/2005 | Smith et al. ..................... 700/28 |

* cited by examiner

*Primary Examiner* — Omar Fernandez Rivas
*Assistant Examiner* — Herng-Der Day
(74) *Attorney, Agent, or Firm* — Oblon, McClelland, Maier & Neustadt, L.L.P.

(57) ABSTRACT

A system for solving equations of a given scientific code for a large dataset represented as a mesh includes first computing circuitry, second computing circuitry, and communication circuitry. The first computing circuitry includes software to arrange the mesh in a sequential order, and a memory to store the mesh data and the results obtained in the execution of the scientific code. The second computing circuitry includes software to execute the scientific code for one vertex of the mesh, and a cache memory to store all the neighboring vertices to the one vertex. The communication circuitry is between the first and second computing circuitry so that the first computing circuitry fed the second computing circuitry with the vertices of the mesh following the sequential order, and the scientific code is executed for all the vertices of the mesh and its results are returned to the first computing circuitry.

13 Claims, 4 Drawing Sheets

SYSTEMS AND METHODS FOR IMPROVING THE EXECUTION OF COMPUTATIONAL ALGORITHMS

FIELD OF THE INVENTION

The present invention refers to systems and methods for the execution of computational algorithms and more in particular to systems and methods for solving the equations of a given scientific code such as one of the codes used in Computational Fluid Dynamics (CFD) for a large dataset represented as a mesh.

BACKGROUND OF THE INVENTION

A common situation in practical industrial applications related to product development is the need to perform quick surveys inside a space of state parameters. In mature and very competitive industrial sectors like aerospace, this need is motivated by the drive to generate products having good technical performance within design cycles that are as short as feasible. That is: time is a key factor in aerospace competitiveness because shortening the time market may provide a leading economic advantage during the product life cycle.

In the specific case of aeronautics, the prediction of the aerodynamic forces, and more generally skin surface values distributions, experimented by an aircraft is an important feature, in order to optimally design its structural components so that the weight of the structure is the minimum possible, but at the same time being able to withstand the expected aerodynamic forces.

Thanks to the increase of the use of the Computer Fluid Dynamics (CFD) the determination of the aerodynamic forces on an aircraft is commonly done by solving numerically the Reynolds Averaged Navier-Stokes equations (RANS equations from now onwards) that model the movement of the flow around the aircraft, using discrete finite elements or finite volume models. With the demand of accuracy posed in the aeronautical industry, each one of these computations requires important computational resources.

A first known approach for improving the execution of said equations for a given model is to provide analytical techniques that simplify the calculations needed for arriving to a solution. An example in this respect can be found in US 2009/157364 in the name of the applicant.

A second approach is the use of computer techniques whether for accelerating the calculation process or for optimizing the computational resources needed for solving a given problem. US 2005/288800 and US 2007/0219766 disclose proposals in this respect.

However the known CFD tools as well as other analogous tools still require large computing times in industrial applications such as particularly the design of aircrafts so that there is a permanent demand for improved computing systems and methods for executing said scientific codes.

The present invention is addressed to the attention of this demand.

SUMMARY OF THE INVENTION

It is an object of the present invention to provide improved systems and methods for solving the equations of a given scientific code such as one CFD code for a large dataset represented as a mesh in terms of computing times and/or computational resources needed.

In a first aspect this and another objects are met by a system for solving the equations of a given scientific code for a large dataset represented as a mesh comprising: a) first computing means including software means for arranging said mesh in a sequential order and memory means for storing the mesh data and the results obtained in the execution of said scientific code; b) second computing means including software means for the execution of said scientific code for one vertex of said mesh and cache memory means for storing all the neighbouring vertices to said one vertex; c) communication means between said first and second computing means so that said first computing means fed the second computing means with the vertices of the mesh following said sequential order, said scientific code is executed for all the vertices of the mesh and its results are returned to said first computing means.

In embodiments of the invention said first computing means is a general-purpose computer and said second computing means is a Field-Programmable Gate Array (hereinafter FPGA). Hereby it is achieved an improved system where the computing operations can be performed on a FPGA profiting the FPGA advantages because the mesh is fed into the FPGA in a sequential order that assures its good performance.

In embodiments of the invention, said mesh is arranged in a sequential order following a breadth-first algorithm starting from an initial vertex (hereinafter seed vertex), suitably selected for reducing the memory needed for storing all the neighbouring vertices involved in the execution of said scientific code for each vertex. Hereby it is achieved a system that allows an optimization of the computational resources needed for the execution of the scientific code.

In embodiments of the invention the selected seed vertex is the vertex closer to the center of mass of the mesh assuming that the weight of each vertex is 1. Hereby it is achieved an suitable system for meshes with no more of two concentration areas.

In embodiments of the invention the selected seed vertex is the vertex that generates a breadth-first-based sequence such that the maximum vertex window (longest subset of the sequence delimited by the first and last appearance of any vertex) is the smallest within a selected subset of mesh vertices. Selection of this subset is driven by a partitioning algorithm. Hereby it is achieved a suitable system for all type of meshes.

In embodiments of the invention, the scientific code is a CFD code and said dataset is the mesh of an object such as particularly an aircraft that moves through a fluid medium. Hereby it is achieved a system of interest for, among others, the aeronautic industry.

In a second aspect the above-mentioned objects are met by a method for solving the equations of a given scientific code for a large dataset represented as a mesh comprising the following steps:
  arranging said mesh in a sequential order using suitable first computing means;
  feeding sequentially the vertices of the mesh into second computing means provided with software means for the execution of said scientific code so that said software means can be executed for each vertex having a random access to its neighbouring vertices;
  storing the results obtained in the execution of said scientific code.

In embodiments of the invention, said mesh is arranged in a sequential order following a breadth-first algorithm starting from a seed vertex suitable selected for reducing the memory needed for storing all the neighbouring vertices involved in the execution of said scientific code for each vertex (using a center of mass method or a partition method). Hereby it is achieved a method that can be implemented optimizing the computer means needed.

In embodiments of the invention said scientific code is a CFD code and said dataset is the mesh of an object such as an aircraft that moves through a fluid medium. Hereby it achieved a method particularly useful in the aeronautic industry.

In a third aspect the above-mentioned objects are met by a computer program product adapted for the execution of the above-mentioned method. Hereby it is achieved a computer program product with similar functionalities to commercial CFD tools such as Fluent or Onera but improving its computing times and/or the computational resources required.

Other characteristics and advantages of the present invention will be clear from the following detailed description of embodiments illustrative of its object in relation to the attached figures.

DETAILED DESCRIPTION OF THE INVENTION

The Computational Problem Involved by CFD Codes

This invention refers to the execution in a computer system of scientific codes for a large dataset represented as a mesh, which is a particular kind of graph that organizes its vertices and edges around the concept of polygonal or polyhedral elements. Meshes are very popular in simulation environments as models to solve Partial Differential Equations.

Computational Fluid Dynamics (CFD) or weather forecasting are examples of fields where meshes are used. Typical CFD codes are the RANS equations or the Euler equations. The reason to focus on meshes is that the data dependencies of the equations are constrained by the mesh connectivity.

As is well known one of the computational problems raised by the execution of said scientific codes for large datasets is related with the memory hierarchy, a performance bottleneck in a high percentage of the scientific codes.

The computer system for the execution of a scientific code may be a system with only a general-purpose Central Processing Unit (CPU) that includes a cache mechanism as part of its memory hierarchy. Thanks to this mechanism, the processor is able to work with as big datasets as the main memory size, or even the hard disk size, hiding at once the latencies of these devices. The transfers between memory levels are transparent to the CPU and also to the programmer, with the exception of timings. This computer system is not an efficient solution for CFD codes and other scientific codes but the memory management is automated in hardware, making life easier to the programmer.

The computer system for the execution of a scientific code may be also a system with several "parallel" CPUs but the data dependencies of scientific codes that use irregular meshes, together with their complex topology, create several network and memory bottlenecks in parallel environments.

The computer system for the execution of a scientific code may be also a system that includes a FPGA as in the systems disclosed in US 2005/288800 and US 2007/0219766. The FPGA memory hierarchy must be designed in conjunction with the rest of the architecture. In addition to the programming difficulties, FPGA systems face another problem: the performance of memory operations is affected by the limited clock frequency at which FPGA designs operate. These frequencies are about one order of magnitude lower than these observed in modern CPUs. When the main memory controller is implemented on the FPGA, as can be the case, the memory traffic will be bound by a low-frequency clock. An additional interconnect between a CPU and a FPGA accelerator is a necessary element that adds on to the list of possible bottlenecks.

THE BASIC IDEAS OF THE INVENTION

The invention is applicable to environments where the vertices of a mesh determine points in the space where a group of operations according to the scientific code must be done. The operations in one vertex depend on data related to that vertex and all of its neighbours. This assumption matches the behaviour of many scientific codes that work on meshes.

The vertices of a mesh are ordered in a sequence and stored in a main memory. They are streamed from the main memory to a processing unit for the execution of the scientific code.

The execution of the scientific code for each vertex in said processing unit is done having a random access to all its neighbouring vertices. The results of each vertex are then transferred back to the main memory in the same order.

Embodiments of the Invention in a Computer System Comprising a General-Purpose Computer and a FPGA Even though the present invention can be implemented in a general-purpose computer improving the execution times with respect to a comparable computing tool due to the ordering of the mesh a preferred embodiment will now be described using a general-purpose computer and a FPGA.

Figure 1:
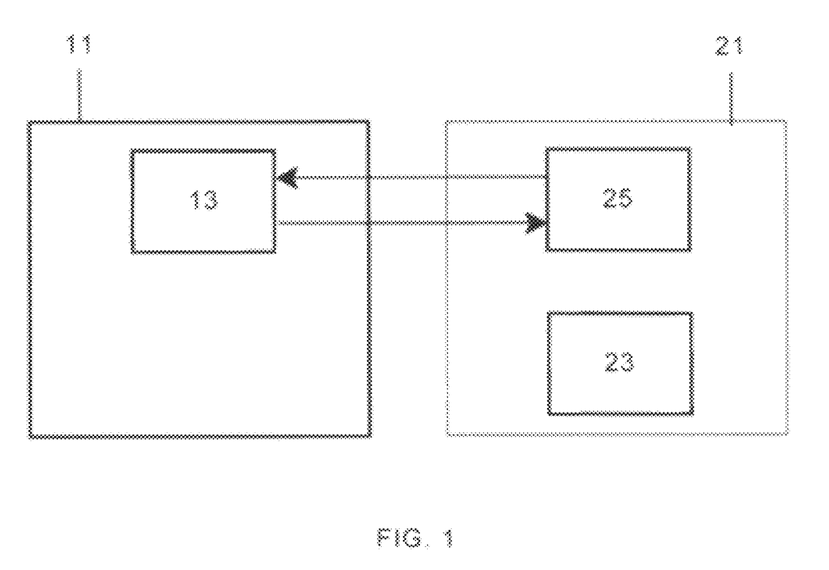
FIG. 1 shows a block diagram of the computing means used in a preferred embodiment of the present invention.

As shown in FIG. 1 a computer system for the execution of a scientific code according to an embodiment of the present invention comprises a general-purpose computer 11 including a main memory 13 and a FPGA 21 comprising a processing unit 23 and a fast on-chip memory 25.

The vertices of the mesh are ordered in the sequence in which they expect to be processed using suitable software means (see below) in the computer 11 and stored in the main memory 13. The resulting stream is subsequently fed into the FPGA 21 and every vertex forced to be kept inside the FPGA 21 until all of the computations involving its data are finished. The results of each vertex are then transferred back to the main memory 13 in the same order.

The fast on-chip memory 25 is used as a custom cache for the slower onboard memory: the main memory 13 streams the mesh into the FPGA 21, while the internal random-access interface between the processing unit 23 and the fast on-chip memory 25 must support irregular access patterns. Hence, the period that a vertex can be kept inside the FPGA 21 is constrained by the size of fast on-chip memory 25. This cache system would prevent multiple transfers of a single vertex by storing many of them on the fast on-chip memory 25.

The main objective is to completely remove cache misses, resulting in each node being transferred to the FPGA 21 only once. Calling the "window" of a vertex the period elapsed between the processing of its first and last neighbours, the maximum window size of a sorted mesh determines somehow the amount of memory that is needed to completely remove "cache misses", since it is the maximum period that a vertex will be forced to stay inside the FPGA 21.

To alleviate the effect of keeping vertices inside the fast on-chip memory 25, the mesh is previously ordered according to suitable algorithm that defines the sequence in which the vertices are processed. The new order minimizes the maximum vertex window with respect to the original order, reducing the time lapse where the vertices must reside in the fast on-chip memory 25 and consequently the amount of memory needed to store these vertices.

Therefore this invention provides a combination of hardware and software techniques that improves data locality and that, rather than waiting for the processing unit 23 to request data, anticipates what will be needed in order to remove latency effects. Specifically, the dataset is ordered and transferred sequentially from the main memory 13 into the application ported to the FPGA 21, which requires a software preprocess of the data and a particular hardware memory operation.

A Preferred Mesh Ordering Algorithm: A Breadth-First Algorithm

The breadth-first algorithm (BF order) used in embodiments of the methods and systems according to this invention traverses the mesh starting from a seed vertex and building a spanning tree for the graph level by level. This is to say that the neighbours of the seed will form the first level, the second-generation neighbours will be the second level, and so on. When a vertex is discovered, since the algorithm keeps a breadth-first order, only two levels of the tree are being processed: the level that the vertex in process belongs to, and the next level, which contains some of its neighbours. Any lower level is completely processed by the algorithm, and successive levels are not yet started.

Figure 2:
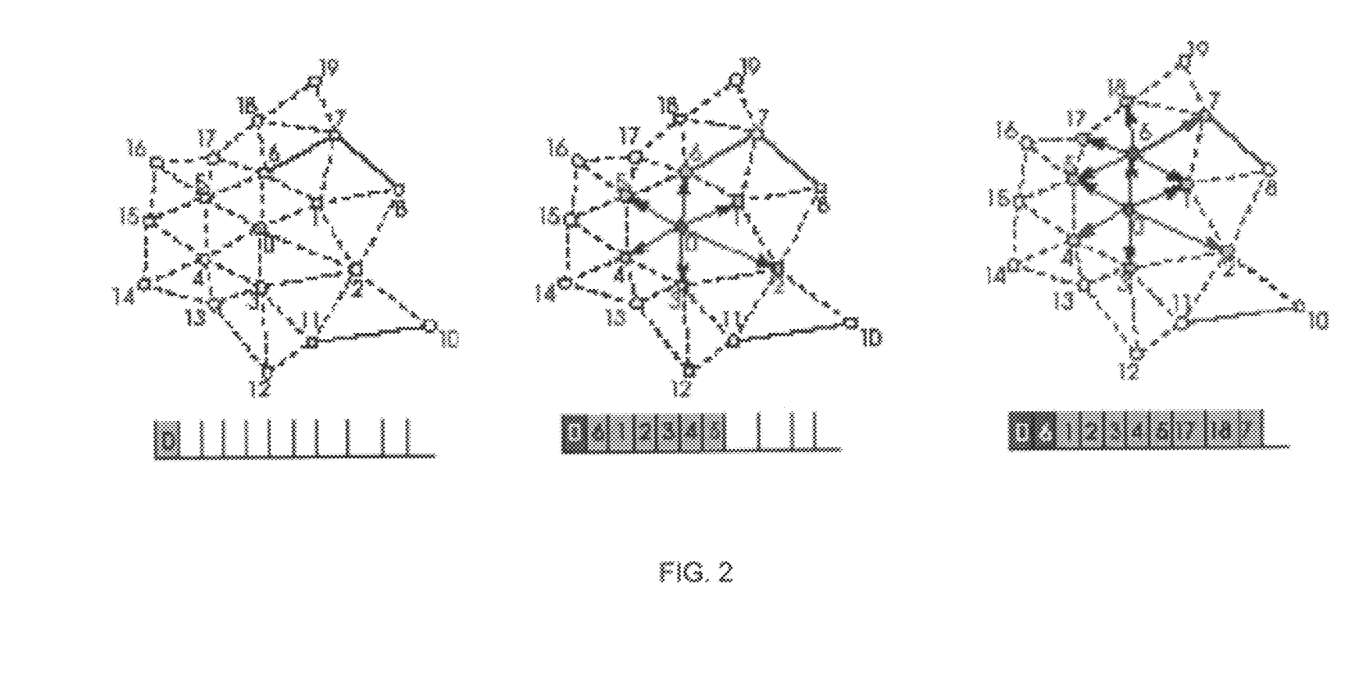
FIG. 2 illustrates the breadth-first evolution by nodes.

FIG. 2 shows the evolution of a vertex-based breadth-first traversal in the first stages (which is preferred for a scientific code than an element-based breadth-first traversal). The evolution of the vertex sequence shows the point at which each vertex is eligible for deletion.

The vertex-based scheme proceeds as follows. Let us define the central vertex as the vertex that triggers unvisited neighbours to be added to the order. We arbitrarily select vertex 0 as the seed. Starting from vertex 0 as central, all of its neighbours are visited next and added to the order. Here we follow a clockwise tie-resolution strategy for clarity, but a random strategy would be also effective. Next, the first neighbour is selected—for example, vertex 6—and proceeds as the new central. This process iterates until every vertex is visited.

When vertex 6 is selected as central, vertex 0 has finished its computations. Hence, it is not needed by the algorithm and can be discarded or written back to upper-level memories, freeing space in the fast on-chip memory 25. Likewise, when vertex 6 is finished, it can be discarded, and so on. Vertices are removed from the FPGA 21 in the same order as they are discovered. As said, only the level in process and the next level must be stored inside the FPGA 21.

If a sequential interface between the main memory 13 and the FPGA 21 is used, a random order will face the storage of the complete mesh in the worst case. This is, if the last processed vertex is a neighbour of the first vertex, it will be brought to the fast on-chip memory 25 together with the first, and will not be eligible for deletion until the end of the computation. With a breadth-first order, at any point, the open frontier is a small percentage of the complete mesh.

Window Size Results

Table I presents the quality results for three ordering methods: original, element-based breadth-first and vertex-based breadth-first for four well known meshes. These are measured in terms of the maximum window length, which sets a lower bound on the required size of the fast on-chip memory 25.

TABLE I

Maximum vertex window with different ordering methods, measured in number of vertices and percentage of the mesh size

| Mesh | No. of vertices | Original order | Breadth first element-based | Breadth-first vertex-based |
| --- | --- | --- | --- | --- |
| NACA1 | 3070 | 2642 (86.1%) | 478 (15.6%) | 260 (8.4%) |
| NACA2 | 7908 | 7905 (99.9%) | 489 (6.2%) | 322 (4.1%) |
| NACA3 | 25651 | 6554 (25.5%) | 972 (3.8%) | 537 (2.1%) |
| HILIFT | 54165 | 31256 (57.7%) | 2248 (4.2%) | 955 (3.1%) |

The data for the original order yields two significant results. Firstly, streaming the NACA2 with the original order, as parsed from the mesh file, would require to store 99.9% of the mesh on the fast on-chip memory 25. This is unacceptable even for a state-of-the-art FPGA. Secondly, there is no relation between the window size and the mesh size, which in turn makes difficult to set upper bounds for the sizes of the input meshes. Breadth-first achieves smaller frontier sizes than the original order, reducing the window by a factor of 5, hitting in some cases a factor of 20.

Additionally, the vertex-based approach obtains smaller windows than the element-based approach. Both vertex and element-based algorithms work well compared to the original order; however, the first shows an improvement of 1% to 7% compared to the second. Hence, if the processing unit 23 does not make use of elements such as triangles or tetrahedrals, a vertex-based order is recommended, since it is more memory-efficient.

Performance on a Traditional CPU System

A detailed profiling has been carried out using traditional time analysis on a CPU and Cachegrind (see Nicholas Nethercote et al. Cachegrind: a cache and branch-prediction profiler.

This tool simulates the cache performance with a particular program, counting all-level cache misses generated by every function of the code. A simple test application has been coded; this converts the mesh into three position arrays, each storing one coordinate of the vertices, and one adjacency array, storing the connections between nodes. The computation involves, for each vertex, adding up all of its coordinates and also the coordinates of its neighbours. This computation stage, although extremely simple, generates nearest-neighbour dependencies, the same memory access patterns as many common scientific codes.

Two instances of the program have been run. The first parses the mesh file and stores the vertices in the arrays, in the order in which they are read. Afterwards, the sum computations are applied to the complete mesh in the sequence that the arrays determine. The second instance, after parsing the file, pre-processes the data structures, using the adjacency array to breadth first traverse the mesh. The data structures are then rearranged in the order that the traversal determines. Measurements for the second code includes the cost of rearranging the data structures, which involve a considerable amount of memory operations. For each code, the computation stage iterates 1000 times over the mesh, for accuracy purposes.

TABLE II

Timings of the test code with two vertex sequences

| Mesh | # vertices | Original order exec. time (s) | Vertex BF order exec. time (s) | Speedup |
| --- | --- | --- | --- | --- |
| NACA1 | 3070 | 0.080 | 0.060 | 1.33 |
| NACA2 | 7908 | 0.145 | 0.139 | 1.04 |

TABLE II-continued

Timings of the test code with two vertex sequences

| Mesh | # vertices | Original order exec. time (s) | Vertex BF order exec. time (s) | Speedup |
|---|---|---|---|---|
| NACA3 | 25651 | 0.795 | 0.791 | 1.01 |
| HILIFT | 54165 | 1.968 | 1.709 | 1.15 |
| VFINE | 494128 | 2.854 | 1.108 | 2.58 |

Table II shows the timings for both codes on an Intel Core2 Quad Q8400 at 2.66 GHz. While there is little to no improvement for the smaller datasets, partly due to the extra cost of the mesh preprocessing, the bigger mesh obtains a considerable speedup of 2.58 only by rearranging the data structures and changing the processing order. It is important to notice that not only the processing sequence has changed, but also the whole data structures have been physically reordered so the cache block mechanisms work well. The breadth-first order is expected to have a greater impact on big datasets, since these will not only use more memory, but also higher levels of the hierarchy, that slow down the executions more easily than the low levels. Furthermore, the speedup depends on how bad the original order is, since there may be no information about how the mesh file was generated.

Breadth-first algorithms are well known in the art but the applicants do not know any previous use of said algorithms for reducing vertex windows with the above-mentioned hardware implications.

Seed Selection

The main disadvantage of transferring the mesh sequentially instead of using a cache mechanism is that the size of the memories imposes an upper bound to the maximum mesh size. Because the mesh is being transferred as a stream, the vertices belonging to a vertex window must be fully loaded onto the fast on-chip memory 25 when that vertex is processed. If the memory size does not have enough capacity, the processing unit 23 will stall indefinitely, as it has no means of requesting the absent vertices to the main memory 13. Therefore, any technique that reduces the maximum vertex window allows for bigger meshes without requiring further costly techniques such as mesh partitioning.

The problem of seed selection involves finding the vertex that will be used as the starting point for the BF algorithm. Seed selection is a separate problem itself. The BF algorithm will work regardless of the seed selection algorithm chosen. However, choosing specific seeds has proven to reduce the maximum vertex window.

Figure 3A:
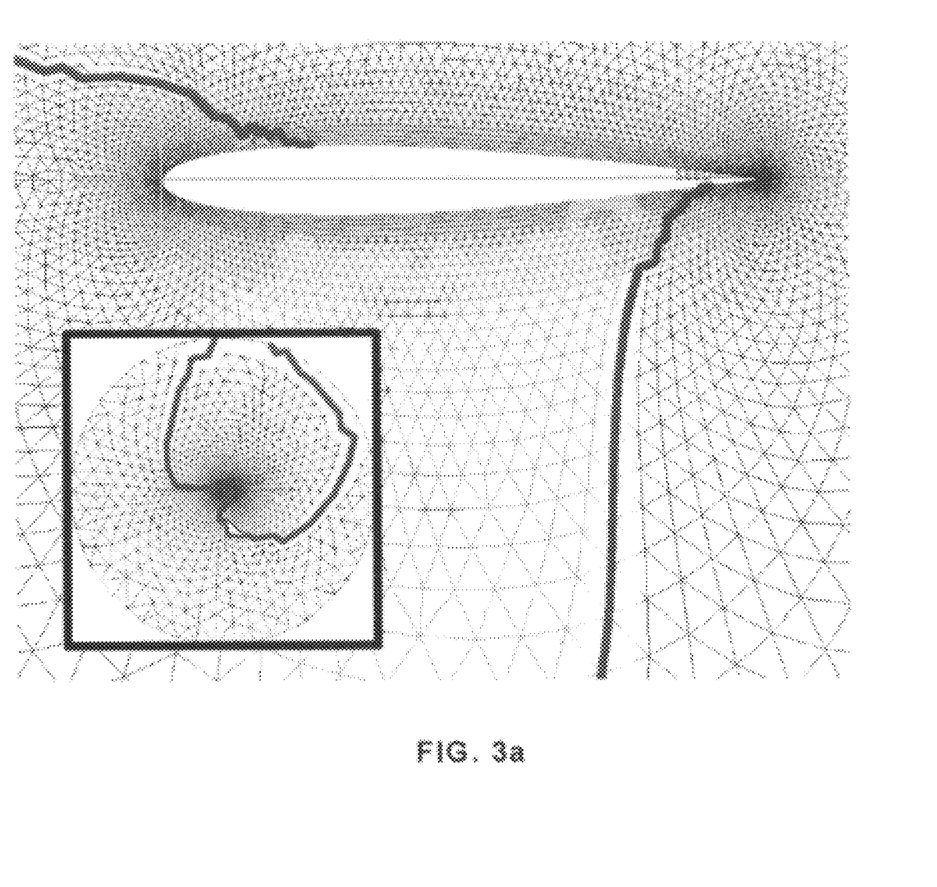
FIG. 3a shows the maximum frontier obtained with the best seed applied to an adaptive mesh commonly used in CFD problems.
Figure 3B:
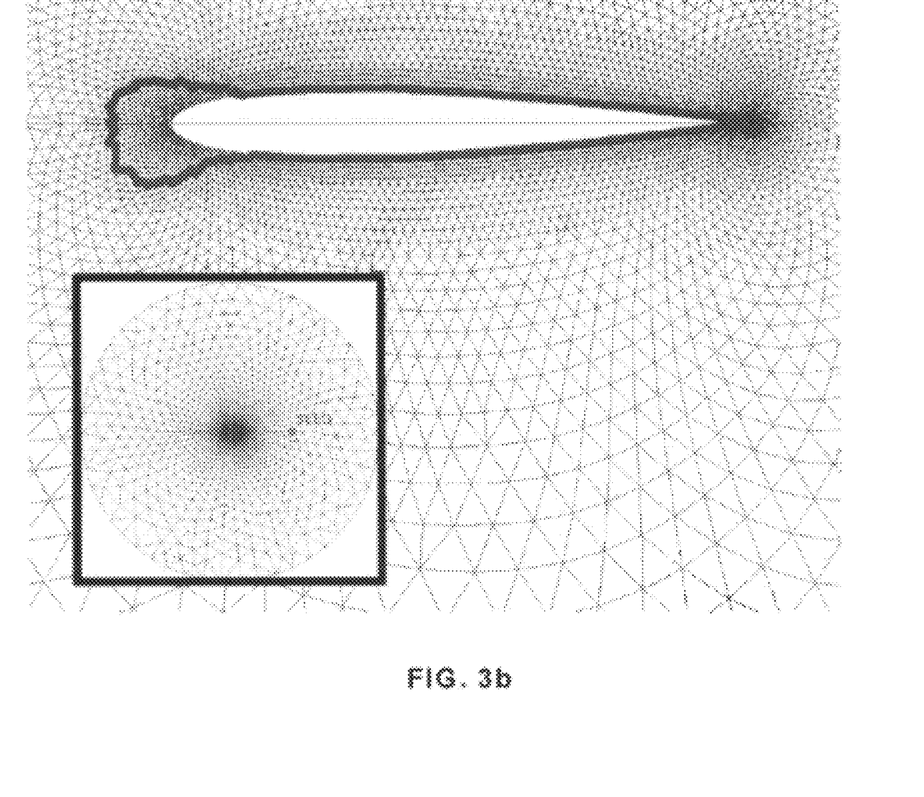
FIG. 3b shows the maximum frontier obtained with the worst seed applied to an adaptive mesh commonly used in CFD problems.

FIGS. 3a and 3b show an example mesh of an airplane wing, where the longest frontiers are marked for, respectively, the cases where the best and worst seed have been used. These frontiers give a good idea of how the size of the maximum vertex window can be diminished:

Some areas of the mesh show higher concentration points. These areas, specifically the left and right sides of the wing, must be reached early in the traversal, since the frontier will be small at that point. As an example, the FIG. 3a show that the best seed is located near the concentration point to the right of the image.

The best seed is also displaced to the left in order to start with the next concentration point early in the execution. Besides, one side of the frontier has already finished with one concentration area before starting with the next. Hence, dealing with various concentration areas simultaneously may result in an early growth of the frontier, which is not desirable.

On the opposite, the worst seed reaches the concentration areas at the end of the BF process. Furthermore, both areas are reached simultaneously, generating a frontier which is twice the size of the frontier for the best seed.

The selection of the starting seed depends largely on the geometry of the mesh and therefore it is difficult to find a unique method applicable to all meshes that can assure that the selected seed is the best seed taking into account that the order of the computing time involved in the calculation of the best seed shall desirably be lesser than the order of the computing time involved in the execution of the scientific code.

Two suitable analytical methods will now be disclosed but it shall be noted than an expert selection can be also an option.

Center of Mass (CM)

This approach is based on the vertex coordinates and it takes its name due to the similarity with the calculation of the center of mass for a discrete solid body. The center of mass of the mesh is calculated assuming that the weight of each vertex is 1. The following equation calculates the center of mass $\vec{CM}$ based on the coordinates $\vec{r}$ of each vertex. The result is a set of coordinates that may not match up with any of the vertices, so the closest vertex to the CM, using the Euclidean distance, is selected as seed.

$$\vec{CM} = \frac{\sum_{i=1}^{N} \vec{r}_i}{N}$$

Some improvements have been observed when the weight of each vertex varies according to a given property. In particular, a vertex can be assigned a high weight if its neighbours are close to it, thus giving more overall weight to the concentration areas. The individual weight of a vertex receives the name of vertex mass. The calculation of the center of mass with variable vertex mass is given by the following equation.

$$\vec{CM} = \frac{\sum_{i=1}^{N} m_i \vec{r}_i}{\sum_{i=1}^{N} m_i}$$

CM works well for simple meshes with no more than two concentration areas. The CM method will force the seed to be close to these areas, allowing them to be reached early in the BF-traversal process. Additionally, the CM will be displaced to the most concentrated area, which will be computed first. More complex meshes cause the CM method to fail, particularly when the points do not concentrate around points such as the wing front and rear in FIGS. 3a and 3b, but around lines or curves.

The CM method, while keeping the execution time low, selects a good seed compared to the optimal selection, and constraints the maximum window size to a small percentage of the complete mesh. However, its correctness depends on the type of mesh: if several point concentration areas are present, or if they cluster around a line or more complex shapes, CM will not perform well.

Bipartition and N-Partition

Bipartition seed selection is based on the bipartition algorithm used to search in an ordered array. Bipartition reduces the cost of linear search, O(N), to O(log$_2$(N)). A general bipartition search algorithm must operate on ordered sequences, since it is based on key comparisons of type "greater than" or "less than" to decide where to look next, to the right or to the left of the sequence. Likewise, the bipartition seed selection algorithm requires an initial temporary order. The key to be found is always the minimum value of the maximum window, and can only be known by computing its BF traversal, which is very costly. The bipartition algorithm reduces the number of traversals from M to $\log_2(M)$, with M being the number of vertices in the mesh.

In general, N-partition will execute $\log_N(M)$ BF traversals. As the search intervals get smaller, it is easier to appreciate the vertex window similarities between neighbours. At these stages, it is easier for the algorithm to make the right decisions, since the information is very local: the slope is easy to follow, and bipartition will make downhill movements until it finds a local minimum. On the opposite, at the first stages of the algorithm, it is easy to make wrong choices, as the probe points are not close to each other and thus do not generate similar maximum windows.

Because the quality of the initial order is very low, bipartition occasionally selects bad seeds. In order to minimize the chances to select a bad seed, an N-partition scheme may be used. Instead of partitioning the initial order in two sections, the N-partition algorithm divides it up into N chunks. As there are more probing points where the maximum window is calculated, the seed will be selected with better knowledge of the search space. This way, we avoid the problem of making wrong decisions at early stages that will lead to a bad seed. Unfortunately, better accuracy comes with a computational cost, since more probing points involve more traversals in order to find the maximum window.

N-partition finds better solutions than CM and, since it does not rely on the geometry of the mesh, it works for all meshes. However, a considerable computing time is required, since the calculation of maximum vertex windows requires to execute graph traversals many times. Generally, we would consider N-partition only if the following processing stage is long. Also, it would be possible to use it if the mesh ordering algorithm is independent of scientific code, since that allows us to order the mesh and use it later as many times as needed.

Although the present invention has been fully described in connection with preferred embodiments, it is evident that modifications may be introduced within the scope thereof, not considering this as limited by these embodiments, but by the contents of the following claims.

The invention claimed is:

1. A system for processing a dataset represented as a mesh, comprising:
   first computing circuitry including:
      software to reorder an original order of vertices of said mesh into a sequential order arranging the vertices according to a sequence of groups of neighboring vertices that are to be processed;
      a memory to store the mesh dataset and results obtained in execution of a scientific code;
   second computing circuitry including:
      software to execute said scientific code for one vertex of said mesh;
      a cache memory to store all the neighboring vertices to said one vertex; and
   communication circuitry between said first and second computing circuitry so that said first computing circuitry feeds the second computing circuitry with the vertices of the mesh following said sequential order, and said scientific code is executed for all the vertices of the mesh and the results obtained in the execution of said scientific code are returned to said first computing circuitry, wherein
   said mesh is arranged in a sequential order following a breadth-first algorithm starting from a seed vertex selected for reducing the cache memory needed for storing all the neighboring vertices involved in the execution of said scientific code for each vertex,
   the seed vertex selected is a vertex closest to a center of mass of the mesh assuming that a weight of each vertex is 1,
   said scientific code is a Computational Fluid Dynamics (CFD) code and said dataset is the mesh of an object that moves through a fluid medium, and
   said object is an aircraft or a component of an aircraft.

2. The system according to claim 1, wherein said first computing circuitry is a general-purpose computer and said second computing circuitry is a Field-Programmable Gate Array (FPGA).

3. The system according to claim 1, wherein the seed vertex selected is a vertex that generates a breadth-first-based sequence such that a maximum vertex window is a smallest within a selected subset of mesh vertices, and wherein selection of said subset is driven by a partitioning algorithm.

4. The system according to claim 1, wherein the mesh includes an irregular arrangement of the vertices of the mesh.

5. A method for processing a dataset represented as a mesh comprising:
   reordering an original order of vertices of said mesh into a sequential order arranging the vertices according to a sequence of groups of neighboring vertices that are to be processed, using first computing circuitry;
   feeding sequentially the vertices of the mesh in the sequential order into second computing circuitry provided with software to execute a scientific code so that said software is executable for each vertex having a random access to its neighboring vertices; and
   storing results obtained in execution of said scientific code, wherein
   said mesh is arranged in a sequential order following a breadth-first algorithm starting from a seed vertex selected for reducing a memory needed for storing all the neighboring vertices involved in the execution of said scientific code for each vertex,
   the seed vertex selected is a vertex closest to a center of mass of the mesh assuming that a weight of each vertex is 1,
   said scientific code is a Computational Fluid Dynamics (CFD) code and said dataset is the mesh of an object that moves through a fluid medium, and
   said object is an aircraft or a component of an aircraft.

6. The method according to claim 5, wherein the seed vertex selected is a vertex that generates a breadth-first-based sequence such that a maximum vertex window is a smallest within a selected subset of mesh vertices, and wherein selection of said subset is driven by a partitioning algorithm.

7. The method according to claim 5, wherein the mesh includes an irregular arrangement of the vertices of the mesh.

8. The method according to claim 5, wherein said first computing circuitry is a general-purpose computer and said second computing circuitry is a Field-Programmable Gate Array (FPGA).

9. A non-transitory machine-readable storage medium comprising a computer program that when run, executes the method according to claim 5.

10. A system for processing a dataset represented as a mesh, comprising:
- first computing circuitry including:
  - software to arrange said mesh in a sequential order;
  - a memory to store the mesh dataset and results obtained in execution of a scientific code;
- second computing circuitry including:
  - software to execute said scientific code for one vertex of said mesh;
  - a cache memory to store all neighboring vertices to said one vertex; and
- communication circuitry between said first and second computing circuitry so that said first computing circuitry feeds the second computing circuitry with the vertices of the mesh following said sequential order, and said scientific code is executed for all the vertices of the mesh and the results obtained in the execution of said scientific code are returned to said first computing circuitry, wherein
- said mesh is arranged in a sequential order following a breadth-first algorithm starting from a seed vertex selected for reducing the cache memory needed for storing all the neighboring vertices involved in the execution of said scientific code for each vertex,
- the seed vertex selected is a vertex closest to a center of mass of the mesh assuming that a weight of each vertex is 1,
- said scientific code is a Computational Fluid Dynamics (CFD) code and said dataset is the mesh of an object that moves through a fluid medium, and
- said object is an aircraft or a component of an aircraft.

11. The system according to claim 10, wherein the mesh includes an irregular arrangement of the vertices of the mesh.

12. The system according to claim 10, wherein said first computing circuitry is a general-purpose computer and said second computing circuitry is a Field-Programmable Gate Array (FPGA).

13. The system according to claim 10, wherein the seed vertex selected is a vertex that generates a breadth-first-based sequence such that a maximum vertex window is a smallest within a selected subset of mesh vertices, and wherein selection of said subset is driven by a partitioning algorithm.

* * * * *